A. S. SPIEGEL (NOW BY JUDICIAL CHANGE OF NAME A. S. SPEER).
VEHICLE WHEEL.
APPLICATION FILED OCT. 25, 1916. RENEWED JUNE 21, 1919.
1,319,911.
Patented Oct. 28, 1919.
3 SHEETS—SHEET 2.
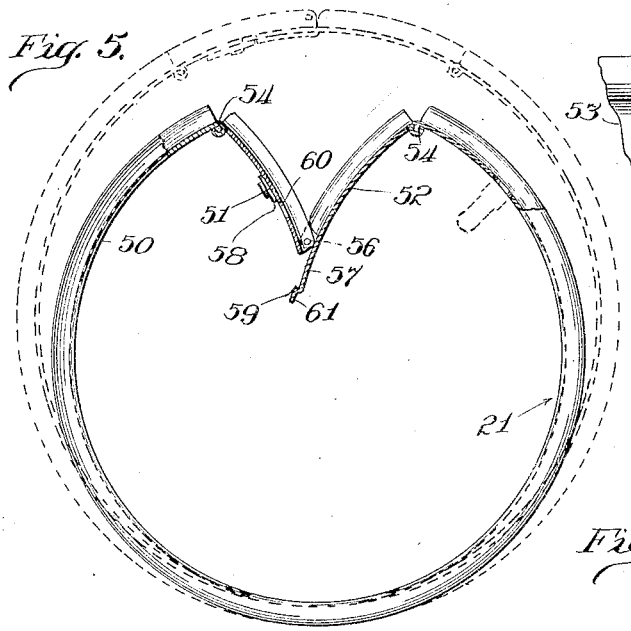
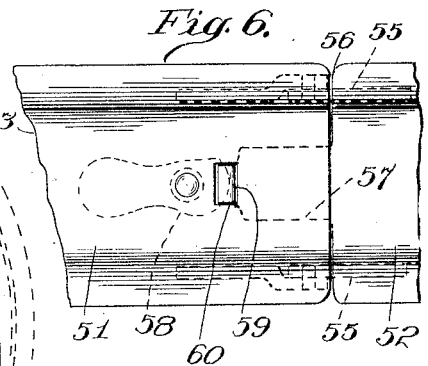
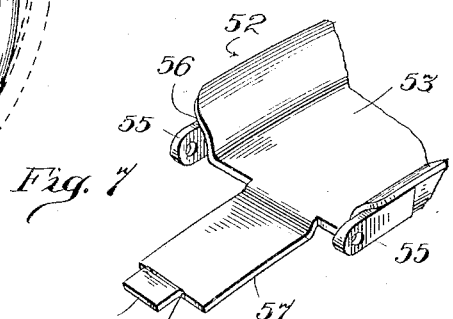
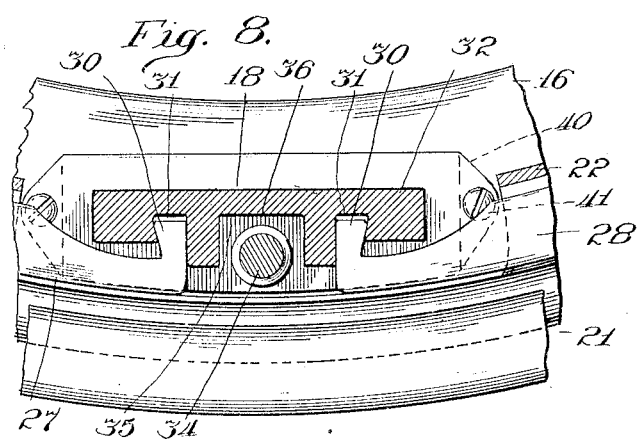
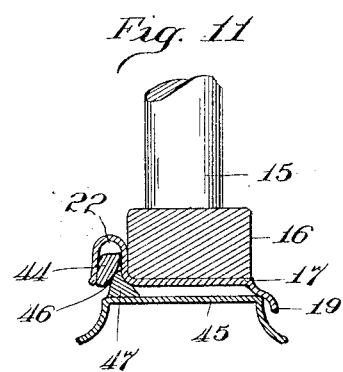
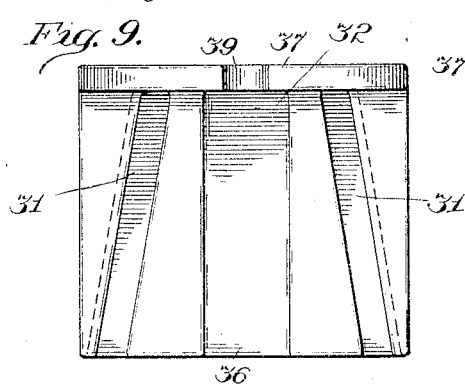
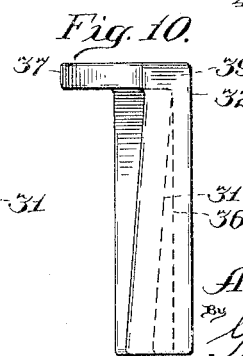
Inventor
Alexander S. Spiegel
By Gillson & Gillson
Attorneys A. S. SPIEGEL (NOW BY JUDICIAL CHANGE OF NAME A. S. SPEER).
VEHICLE WHEEL.
APPLICATION FILED OCT. 25, 1916. RENEWED JUNE 21, 1919.
1,319,911.
Patented Oct. 28, 1919.
3 SHEETS—SHEET 3.
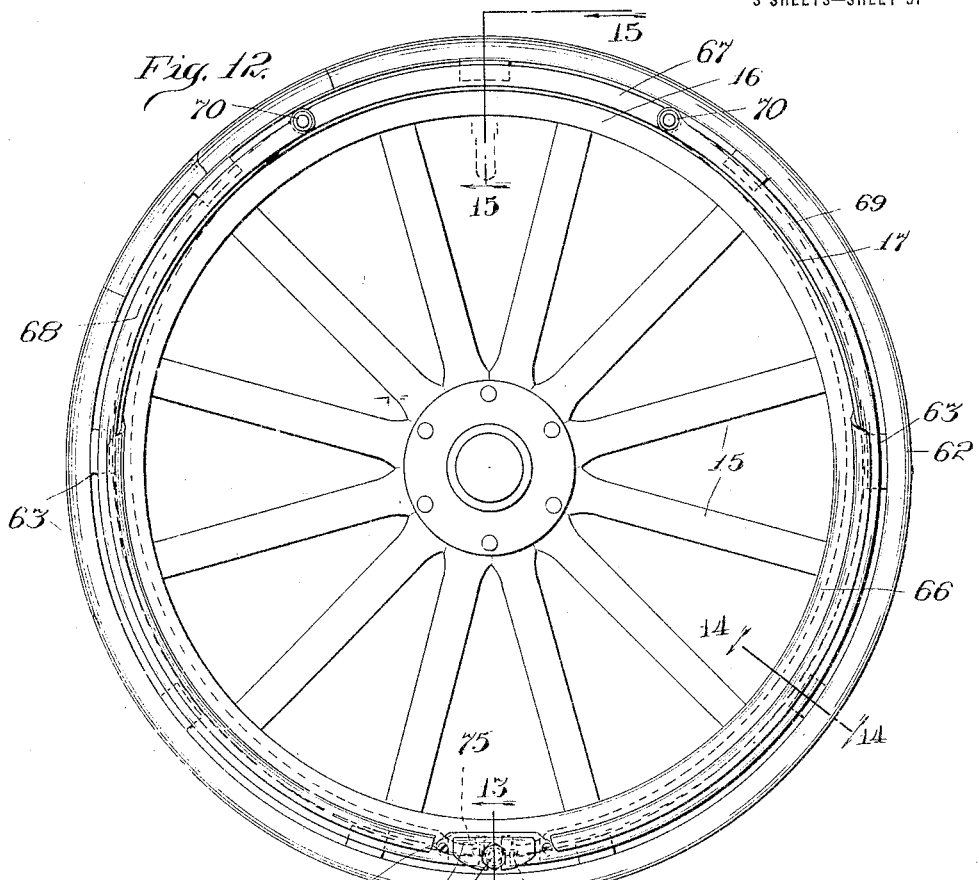
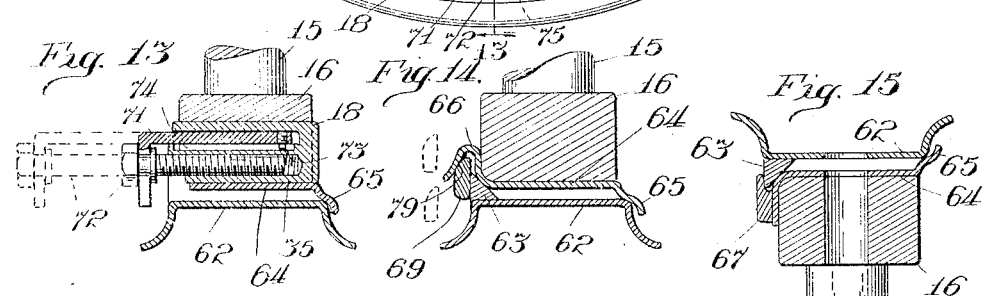
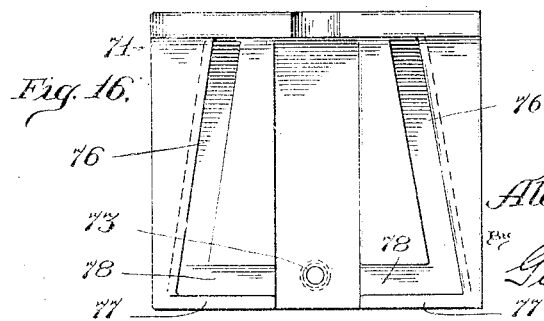
Inventor
Alexander S. Spiegel
By
Gillson & Gillson
Attorneys

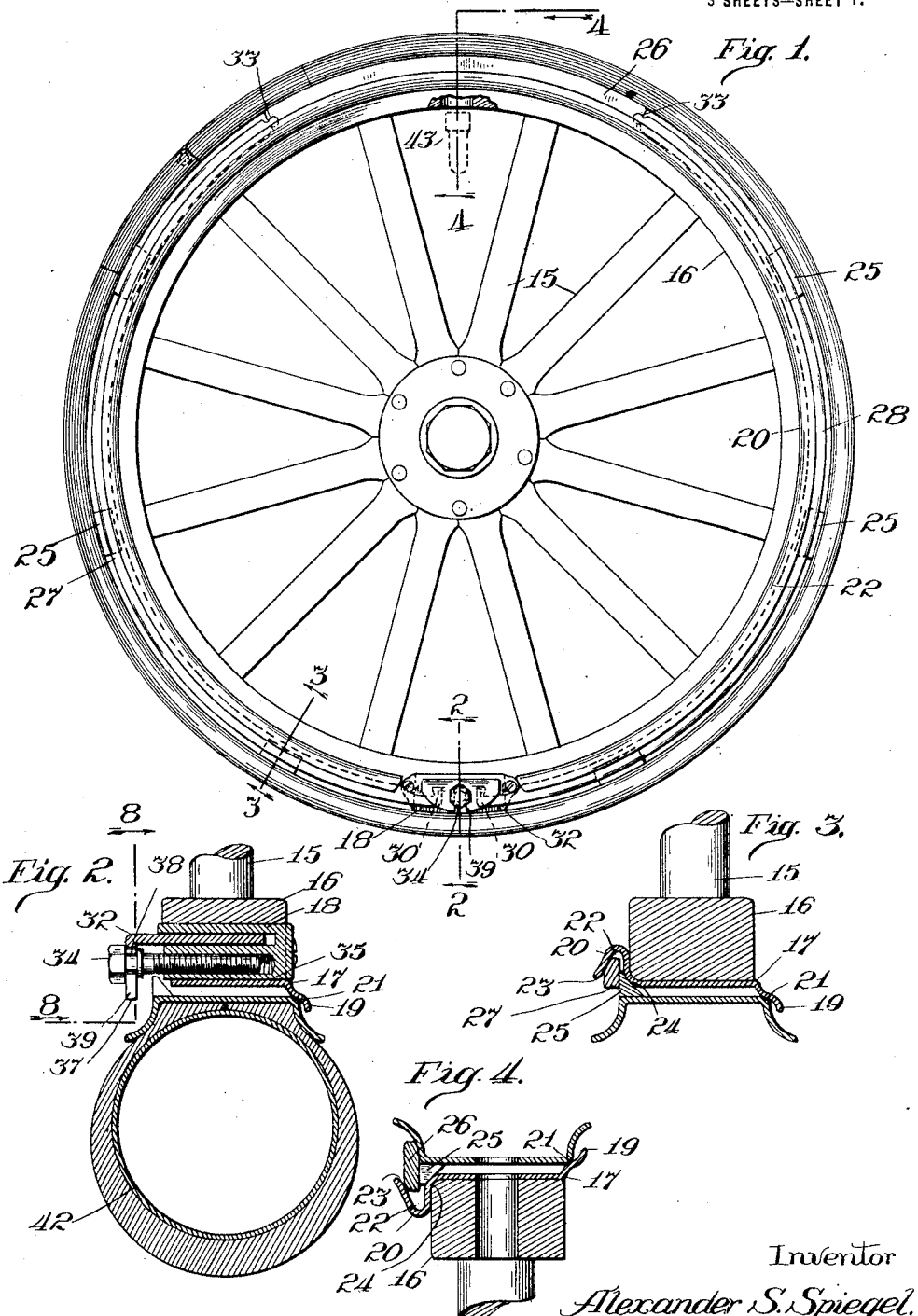

UNITED STATES PATENT OFFICE.

ALEXANDER S. SPIEGEL, (NOW BY JUDICIAL CHANGE OF NAME ALEXANDER S. SPEER,) OF CHICAGO, ILLINOIS.

VEHICLE-WHEEL.

1,319,911. Specification of Letters Patent. Patented Oct. 28, 1919.

Application filed October 25, 1916, Serial No. 127,544. Renewed June 21, 1919. Serial No. 305,935.

*To all whom it may concern:*

Be it known that I, ALEXANDER S. SPIEGEL, now by judicial change of name ALEXANDER S. SPEER, a citizen of the United States, and resident of Chicago, county of Cook, and State of Illinois, have invented certain new and useful Improvements in Vehicle-Wheels, of which the following is a specification, and which are illustrated in the accompanying drawings, forming a part thereof.

The invention relates to vehicle wheels, and more particularly to those which are provided with an inflated tire and a removable rim upon which the tire is mounted.

The object of the invention is to facilitate the removal and replacement of the rim with the tire mounted thereon, while still maintaining a firm connection of the rim with the wheel body in use. The invention accordingly contemplates a construction in which the fastening of the rim upon the wheel body may be accomplished by the manipulation of a single screw-bolt.

In the accompanying drawings—

Figure 1 is a side elevation showing a vehicle wheel embodying the features of improvement provided by the invention;

Figs. 2, 3 and 4 are sectional views taken on the lines 2—2, 3—3 and 4—4, respectively, of Fig. 1;

Fig. 5 is a side view of the rim showing the parts in two different positions by full and dotted lines, respectively;

Fig. 6 is a plan view showing a detail of the rim;

Fig. 7 is a detail perspective view of the rim;

Fig. 8 is a sectional view taken on the line 8—8 of Fig. 2;

Figs. 9 and 10 are a plan view and a side elevation, respectively, of a wedge which enters into the construction of the wheel;

Fig. 11 is similar to Fig. 3 but shows a modified form of construction;

Fig. 12 is similar to Fig. 1 but shows another modified form of construction, a different position of some of the parts being shown in dotted lines;

Figs. 13, 14 and 15 are sectional views taken on the lines 13—13, 14—14, and 15—15 respectively of Fig. 12, dotted lines being used in each of Figs. 13 and 14 to show a different position of some of the parts, and Fig. 16 is a plan view showing the form of wedge which may be used with the construction illustrated in Figs. 12 to 15 inclusive.

For the purpose of illustrating the invention the drawings show a vehicle wheel comprising the usual wooden spokes 15 and a wooden felly 16. When the wooden felly 16 is used, this felly is preferably surrounded with a permanent metal band 17 and the felly is recessed at one side of the wheel to receive a chambered metal wedge housing, generally designated 18. The metal band 17 is formed with an inclined outstanding flange 19 along one of its edges, and with a recurved instanding flange 20 along its opposite edge. In this form of construction the flange 19 of the band 17 provides a beveled shoulder against which one side of the demountable rim, as 21, is seated, while the flange 20 at the other edge of the band 17 provides an outwardly facing annular groove 22 having an inclined outer wall 23 and a beveled shoulder 24 upon its inner wall.

In the form of construction illustrated in Figs. 1 to 10 inclusive, the demountable rim 21 is provided at intervals along one edge with a plurality of instanding rigid wedge lugs 25, and with a sectional binding ring comprising a fixed section 26 and the two movable sections 27 and 28. In applying the demountable rim 21 to the wheel, one edge of the rim is engaged with the inclined flange 19 of the metal band 17, while the wedge lugs 25 engage with the beveled shoulder 24. It, therefore, follows that lateral pressure upon the rim serves to firmly seat it upon the wheel body. In this connection, the use of a plurality of separate wedge lugs 25, located at intervals about the rim 21 is deemed important as the elasticity of the rim insures that each wedge lug may be firmly engaged with the beveled shoulder 24.

In the form of construction illustrated in Figs. 1 to 10 inclusive, the lateral pressure upon the rim 21 is obtained by forcing the ring sections 26, 27 and 28 into the groove 22 of the band 17, the ring sections 26, 27 and 28 being formed with chamfered edges for coöperation with the inclined side wall 23 of the said groove. As shown the ring sections 26, 27 and 28 are forced into the groove 22 by drawing the adjacent ends of the movable ring sections 27—28 together. For this purpose the movable ring sections 27—28 are formed with hooks as 30 at their free ends and these hooks are engaged with the inclined grooves 31 of a movable wedge block 32. To prevent disengagement of the hooks 30 from the grooves 31 otherwise than through the inner ends of the grooves, the hooks and grooves are desirably made of complementary dovetail shape. The ends of the movable ring sections 27—28 remote from the hooks 31 may be anchored to the rim 21 in any convenient manner but preferably to permit the ring sections to swing in front of the wedge lugs 25. As shown, the fixed ring section 26 is secured against the adjacent wedge lugs 25, and the movable ring sections 27—28 are pivotally united with the ends of the section 26, as at 33, Fig. 1.

The wedge block 32 slides in the chamber of the housing 18. Movement of the wedge block 32 in either direction is accomplished by the rotation of a screw bolt 34. It follows that this screw bolt is the only part required to be operated for mounting the rim 21 upon the wheel body or removing it therefrom. As shown the wedge housing 18 is formed with a central rib 35 and this rib is apertured and threaded for receiving the screw bolt 34. The wedge block 32, on the other hand, is formed with a central groove 36 for receiving the rib 35 of the housing 18. Movement of the wedge block 32 with the screw bolt 34 in both directions is insured by providing the wedge block with an integral upstanding flange 37 at its outer end and by forming the screw bolt with an annular groove 38, just under the head of the bolt, which groove is engaged with a notch 39 in the flange 37. Preferably the wedge housing 18 is firmly held against movement in the felly 16. For this purpose the wedge housing 18 may be formed with oppositely projecting lateral ears, as 40, at its inner end and these ears are seated against the side of the felly 16 upon the inside or rear face of the wheel. Attaching screws, as 41, enter the felly 16 through the ears 40.

In dismounting the rim 21 from the wheel body the screw bolt 34 and the wedge block 32 are completely withdrawn from the housing 18 and may be entirely removed from the wheel. The hooks 30 thus become disengaged from the grooves 31 through the inner ends of the said grooves. If this has been accomplished with the wheel turned to a position in which the free ends of the movable ring sections 27—28 are at the lower side of the wheel, these ring sections swing out of the groove 22 by gravity. The lower portion of the rim 21 may then be drawn forwardly, clear of the wheel, and by lifting the rim the fixed ring section 26 will also be disengaged from the groove 22. The rim is now completely removed from the wheel body. The several parts, 26, 27, 28, of the locking ring, being permanently associated with the rim 21, are removed with it.

When a pneumatic tire, as 42, is mounted upon the rim 21, the rim 21, band 17 and felly 16, are preferably apertured to receive the valve stem, as 43, of the tire in line with the mid length of the fixed ring section 26. Under these circumstances the operation of lifting the rim 21 to withdraw the fixed ring section 26 from the groove 22 serves also to withdraw the valve stem from the openings through the band 17 and felly 16. Similarly, in applying the rim 21 to the wheel body, the operation of entering the valve stem 43 in the openings through the band 17 and felly 16, serves to position the rim for engagement of the hooks 30 at the free ends of the movable ring sections 27—28 with the grooves 31 of the wedge block 32.

In the form of construction illustrated in Fig. 11, the movable sections, as 44, of the binding ring are permanently associated with the felly 16. Under these circumstances the fastening of the demountable rim, as 45, upon the wheel body may be accomplished by outward movement of the movable ring sections, as 44. This movement serves to expand the binding ring rather than to contact the said ring as is the case in the form of construction illustrated in Figs. 1 to 10. In the arrangement illustrated in Fig. 11 the chamfered edge, as 46, of the movable ring section 44 is preferably located upon the inside of the ring section for engagement with the wedge lugs, as 47, of the rim. When this construction is employed the outer wall of the annular groove 22 is preferably not inclined and merely serves as an abutment to prevent outward movement of the movable ring sections, as 44. The wedge lugs 47 upon the rim 45 may be in all respects like the wedge lugs 25 upon the rim 21, shown in Fig. 1 to 10.

To facilitate the removal of the tire, as 42, from the rim 21, this rim may be constructed to comprise a plurality of hingedly connected sections as 50, 51 and 52. As shown the section 50 comprises a substantial part of the entire circumference of the rim while the sections 51 and 52 are of like length and together comprise only the remainder of the circumference of the rim. If, now, the sections 51 and 52 be deflected inwardly to the position indicated by dotted lines in Fig. 5, the diameter of the rim is greatly reduced and the tire, as 42, is easily removed or replaced.

The construction requires the use of a suitable locking means for normally holding the rim sections 51 and 52 in alinement with the circumference of the rim. It is also desirable that this locking means and the hinges provided for uniting the several sections of the rim should be so constructed as not to extend inwardly beyond the inner surface of the rim a greater distance than the thickness of the material from which the rim is formed. As shown, each of the rim sections 51 and 52 is united with the adjacent end of the rim section 50 by a piano case form of hinge, 54. These hinges preferably extend only across the tread or floor plate, as 53, of the rim. On the other hand, the rim sections 51—52 are connected with each other by hinge plates, as 55, which extend from the flanges, as 56, of the rim.

The particular locking means illustrated in the drawings for holding the rim sections 51—52 in alinement with the circumference of the rim comprises a tongue 57 and a pivoted locking plate 58. The tongue 57 is formed integral with the rim section 52 and extends from one of its ends. The main portion of this tongue is offset from the tread or floor plate 53 of the rim to normally lie against the under side of the floor plate 53 of the rim section 51. The end of the tongue 57, however, is turned upwardly, as at 59, to enter an aperture 60 in the floor plate or tread of the rim section 51. The end of the tongue 57 is also formed with an inwardly facing shoulder 61 and the locking plate 58 swings against the under side of the rim section 51 for engagement with this shoulder. The construction provides that the rim may be contracted by pressure upon the sections 51—52 when the locking plate 58 has been moved out of engagement with the shoulder 61. The movable parts of the rim thereby serve as a contracting tool and no separate tool is required either for the contraction or expansion of the rim. As the rim sections 51 and 52 swing outwardly beyond the line of the two piano case hinges, 54, the rim section 50 is preferably made elastic and of such form as to tend to assume the contracted shape. The elasticity of the rim section 50 thus assists in holding the sections 51 and 52 in extended position. On the other hand, the contraction of the rim is greatly facilitated for it only requires that the connected ends of the rim sections 51 and 52 be forced inwardly beyond the line of the hinges 54. The remainder of the inward movement of the rim sections 51, 52 automatically results from the elastic contraction of the section 50. As the tire, as 42, is preferably applied to the rim 21 with its valve stem, as 43, projecting through an aperture in the rim section 50 adjacent one end of the same, the location of the rim sections 51 and 52 beyond one end of the fixed section 26 of the binding rim readily follows.

While the form of construction illustrated in Fig. 11 permits of a permanent association of all of the sections, as 44, of the binding ring with the wheel body, this is also permitted by the form of construction shown in Figs. 12 to 16. In this instance the demountable rim, as 62, is provided with a plurality of instanding rigid wedge lugs, as 63, located at intervals about the rim but while the metal band, as 64, which surrounds the felly 16 is formed with a continuous flange 65 along one edge, the groove 66 at its other edge extends only a part of the distance about the wheel. As shown, the fixed section, as 67, of the binding ring is permanently secured against the felly 16 at the place where the groove 66 is omitted and at equal distances from the ends of the said groove at each side. Preferably the ring section 67 is so located as to extend in front of the corresponding wedge lugs 63, (Fig. 15) to prevent outward movement of the rim at this point. In applying the rim 62 to the wheel it is therefore necessary to enter the said wedge lugs 63 behind the fixed rim section 67 before the opposite side of the rim is passed over the felly.

The movable sections, as 68—69, (Fig. 12) of the binding ring are united with the ends of the section 67 by pivots, as 70. These pivots are preferably sufficiently loose to permit the movable ring sections to have a limited movement forwardly from the wheel, in addition to a swinging movement in the plane of their curvature. Under these circumstances the movable ring sections 68—69 may be entered in the groove 66, in front of the wedge lugs 63 of the demountable rim, or if swung outwardly and then forwardly they may then be swung inwardly, clear of the walls of the groove 66, to the position shown by dotted lines in Figs. 12 and 14. When the ring sections 68—69 have been moved to the last mentioned position, the demountable rim 62 is easily removed from the wheel body by drawing forward that portion of the rim which is remote from the fixed ring section 67.

Preferably a wedge block, as 71, (Fig. 16) is employed for swinging the movable ring sections 68—69. The wedge block shown serves only for moving the ring sections into and out of the groove 66 and for drawing the ring sections forwardly when disengaged from the groove. When this wedge block is used, the swinging of the ring sections 68—69, clear of the walls of the groove may be accomplished by hand. As shown, the wedge block 71 slides in the chamber of the wedge housing 18, the movement being controlled by a screw bolt 72. The screw bolt 72 engages with the wedge block and with the central rib 35 of the wedge housing 18 in the same manner as the screw bolt 34, more particularly illustrated in Fig. 2, except that the movement of the wedge block 71 is preferably limited and the wedge block 71 and screw bolt 72 are never completely withdrawn from the housing 18. A convenient means of limiting the movement of the wedge block 71 to prevent the separation of the wedge block and its actuating screw bolt 72 from the wheel consists in mounting a stud 73 in the wall of the housing 18 for entering a groove 74 in the back of the wedge block.

The movable ring sections 68—69 are formed with hooks 75 at their free ends and these hooks are normally engaged with the inclined grooves 76 of the wedge block 71. The wedge block is, however, provided with upstanding flanges 77 at its inner end, and with transverse grooves 78 which communicate with the inner ends of the inclined grooves 76. As the wedge block approaches the limit of its outward movement, the flanges 77 engage the ring sections 68—69 and draw them forwardly, clear of the walls of the groove 66, (Fig. 14). Movement of the ring sections 68—69 toward each other may then be manually accomplished, the ends of the ring sections moving in the transverse grooves 78. The cam engagement of the chamfered edges, as 79, (Fig. 14) of the ring sections 68—69 with the front wall of the groove 66 serves to force the adjacent portions of the rim 62 inwardly until the rim is firmly seated upon the wheel body.

In either of the forms of construction illustrated, the fastening of the rim upon the wheel body involves the manipulation of but a single screw bolt, as 34, (Figs. 1 and 2) or 72 (Figs. 12 and 13). This not only shortens the operation but it also facilitates it for there is no possibility that the turning of a second screw bolt may be rendered difficult by the previous tightening of another. It is also a characteristic feature of all of the forms of construction shown, that the demountable rim is entirely loose upon the wheel body until the movable sections, as 27—28, 44, or 68—69 of the binding ring have been tightened. No hammering or other form of exertion is therefore involved either in lifting the demountable rim from the wheel body or in replacing it.

I claim as my invention:

1. In a vehicle wheel, in combination, a wheel body having a flat peripheral face and an outstanding beveled flange and an outwardly facing groove at opposite sides of the said face, the diameter of the wheel body at the mouth of the groove not exceeding the diameter at the said face, a rim removably surrounding the wheel body, wedge lugs carried by the rim for engaging the inner side wall of the said groove and a binding ring comprising a section permanently attached to the rim and sections pivotally connected to each end of the first section and movable in the groove of the wheel body in front of the said wedge lugs.

2. In a vehicle wheel, in combination, a wheel body having a flat peripheral face and an annular outstanding beveled flange and an outwardly facing annular groove extending along opposite sides of the said face, the diameter of that part of the wheel body forming the front wall of the groove being less than the diameter at the said face, a rim removably surrounding the wheel body, the rear edge of the rim being seated against the said beveled flange of the wheel body, wedge lugs mounted upon the inside of the rim at intervals about the same for cam engagement with the inner side wall of the groove of the wheel body and a beveled contracting ring comprising a section permanently attached to the rim and sections pivotally connected to each end of the first section and entering the said groove in front of the said wedge lugs and having a cam engagement with the front wall of the said groove.

3. In a vehicle wheel in combination, a wheel body having a flat peripheral face and an annular outstanding beveled flange and an outwardly facing annular groove extending along opposite sides of the said face, the diameter of that part of the wheel body forming the front wall of the groove being less than the diameter at the said face, a rim removably surrounding the wheel body, the rear edge of the rim being seated against the said beveled flange of the wheel body, wedge lugs mounted upon the inside of the rim at intervals about the same for cam engagement with the inner side wall of the groove of the wheel body, a beveled split ring comprising a section permanently attached to the rim and sections pivotally connected to each end of the first section and entering the said groove in front of the said wedge lugs for cam engagement with the front wall of the groove, and means engaging the ends of the pivotally connected sections of the split ring for contracting the ring.

4. In a vehicle wheel, in combination, a wheel body having a flat peripheral face and an annular outstanding beveled flange and an outwardly facing annular groove extending along opposite sides of the said face, the diameter of that part of the wheel body forming the front wall of the groove being less than the diameter at the said face, a rim removably surrounding the wheel body, the rear edge of the rim being seated against the said beveled flange of the wheel body, wedge lugs mounted upon the inside of the rim at intervals about the same for cam engagement with the inner side wall of the groove of the wheel body, a beveled split ring entering the said groove in front of the said wedge lugs for cam engagement with the front wall of the groove, and a wedge block movable transversely through the wheel body and having inclined grooves for receiving the ends of the split ring.

5. In a vehicle wheel, in combination, a wheel body having a flat peripheral face, an outstanding annular shoulder extending along the rear edge of the said face and an outwardly facing groove extending along the front edge of the said face at one side of the wheel, a rim removably surrounding the wheel body, the rear edge of the rim being seated against the said shoulder, lugs mounted upon the inside of the rim for entering the groove of the wheel body at one side of the wheel, means extending in front of the rim at the other side of the wheel, a pair of oppositely swinging arms entering the groove of the wheel body in front of the said lugs and means for contracting said arms and thereby forcing said lugs against the wheel body.

6. In a vehicle wheel, in combination, a wheel body having a flat peripheral face, an outwardly and rearwardly inclined beveled shoulder at the rear edge of the said face and an inwardly and forwardly inclined beveled shoulder at the front edge of the said face, a rim removably surrounding the wheel body, the front and rear edges of the rim being constructed for cam engagement with the said two beveled shoulders of the wheel body, and a binding ring for forcing the rim rearwardly upon the wheel body.

7. In a vehicle wheel, in combination, a wheel body having a flat peripheral face, an outwardly and rearwardly inclined beveled shoulder at the rear edge of the said face and an inwardly and forwardly inclined beveled shoulder at the front edge of the said face, a rim removably surrounding the wheel body, the front and rear edges of the rim being constructed for cam engagement with the said two beveled shoulders of the wheel body, a binding ring for forcing the rim rearwardly upon the wheel body, and means for limiting the said rearward movement of the rim upon the wheel body.

8. In a vehicle wheel, in combination, a wheel body having a flat peripheral face, an outstanding annular shoulder extending along the rear edge of the said face and an outwardly facing groove extending along the front edge of the said face at one side of the wheel, a rim removably surrounding the wheel body, the rear edge of the rim being seated against the said shoulder, lugs mounted upon the inside of the rim for entering the groove of the wheel body at one side of the wheel, means extending in front of the rim at the other side of the wheel, and a pair of oppositely swinging arms permanently connected to the rim entering the groove of the wheel body in front of the said lugs.

9. In a vehicle wheel, in combination, a wheel having a flat peripheral face, an outwardly and rearwardly beveled shoulder at the rear edge of said face, and a binding ring comprising a permanently fixed section and two movable sections pivotally associated with said fixed section adapted for forcing the rim rearwardly upon the wheel body, the front and rear edges of the rim being constructed for cam engagement with the ring and wheel body respectively.

ALEXANDER S. SPIEGEL.

Copies of this patent may be obtained for five cents each, by addressing the "Commissioner of Patents, Washington, D. C."